United States Patent [19]

Pellenc et al.

[11] Patent Number: 4,975,016

[45] Date of Patent: Dec. 4, 1990

[54] AUTOMATED MACHINE FOR DETECTION AND GRASPING OF OBJECTS

[75] Inventors: Roger Pellenc; Jose L. Montoya, both of Pertuis; Antoine G. D'Esnor, Saint-Bauzille de Montmel; Marc Rombaut, Castries, all of France

[73] Assignee: Etablissements Pellenc et Motte, Centre National Du Machinisme Agricole Du Genie Rural, des Eaux et des Forets (csm agrcr), Montpellier, France

[21] Appl. No.: 116,953

[22] Filed: Nov. 5, 1987

[30] Foreign Application Priority Data

Nov. 5, 1986 [FR] France .................. 86 15522

[51] Int. Cl.[5] .............................. A01D 45/00
[52] U.S. Cl. .................. 414/501; 56/328 R; 901/47; 901/40; 901/15; 414/730; 414/505; 414/627; 414/555; 414/917; 414/752; 294/64.1
[58] Field of Search .......... 56/12.9, 13.1, 13.2, 56/16.4; 901/40, 47, 46, 15; 414/502, 503, 504, 505, 569, 555, 729, 730, 627, 737, 744 B, 752, 22, 917, 501; 294/64.1

[56] References Cited

U.S. PATENT DOCUMENTS

| | | | |
|---|---|---|---|
| 3,716,147 | 2/1973 | Pipes | 414/627 X |
| 4,312,622 | 1/1982 | Favareto | 414/730 |
| 4,402,053 | 8/1983 | Kelley et al. | 414/730 X |
| 4,408,943 | 10/1983 | McTamaney et al. | 244/135 A X |
| 4,519,193 | 5/1985 | Yoshida et al. | |
| 4,532,757 | 8/1985 | Tutle | |
| 4,548,544 | 10/1985 | Van Appledorn | |
| 4,638,143 | 1/1987 | Akeel | 901/47 X |
| 4,662,668 | 5/1987 | Hufford | 294/64.1 |
| 4,663,925 | 5/1987 | Terada | |
| 4,698,775 | 10/1987 | Koch et al. | 901/47 X |
| 4,712,818 | 12/1987 | Borgman et al. | 294/64.1 |
| 4,724,301 | 2/1988 | Shibata et al. | 901/47 X |
| 4,808,064 | 2/1989 | Bartnolet | 901/47 X |

FOREIGN PATENT DOCUMENTS

| | | | |
|---|---|---|---|
| 258313 | 10/1963 | Australia | 414/555 |
| 2452864 | 10/1980 | France | |
| 2531604 | 2/1984 | France | |
| 2155747 | 10/1985 | United Kingdom | |

Primary Examiner—Frank E. Werner
Attorney, Agent, or Firm—Sandler, Greenblum & Bernstein

[57] ABSTRACT

An automated machine comprising a handler mounted with a rotating aptitude about two perpendicular and intersecting rotational axes, having a free end fitted with a mechanical hand comprising an intake head. A vision system is permanently installed at the point of intersection of the rotational axes in a base unit comprised of a cradle which supports a rotatable turret which has an extension arm attached to another end of the handler. The handler is comprised of two branches comprising a folding arm that are joined together at one end with devices provided for symmetrical movement of both branches when an external force is exerted on either of them. The automated machine contains devices for deployment and retraction of its folding arms so as to grasp and release an object detected by the vision system installed in the handler apparatus.

34 Claims, 6 Drawing Sheets

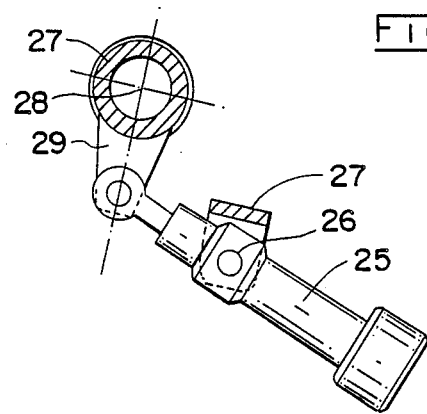
Fig—5
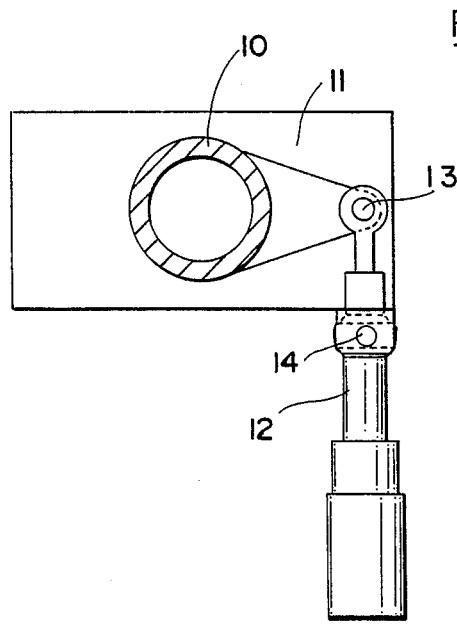
Fig—6
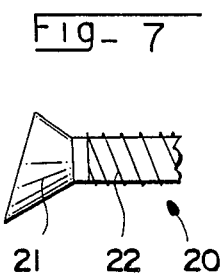
Fig—7

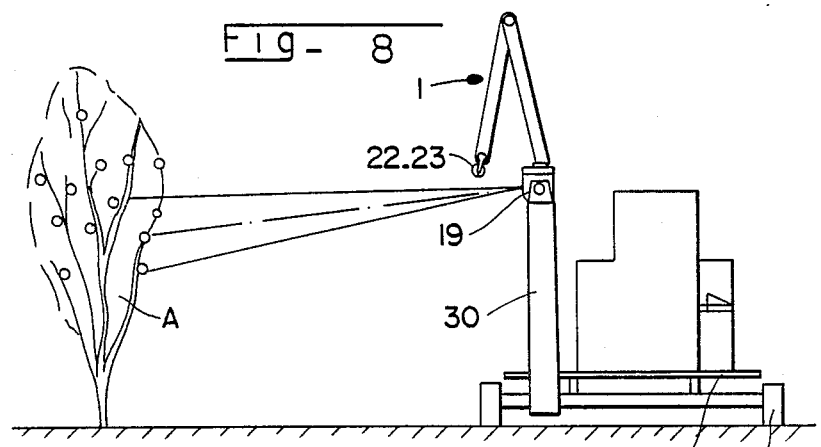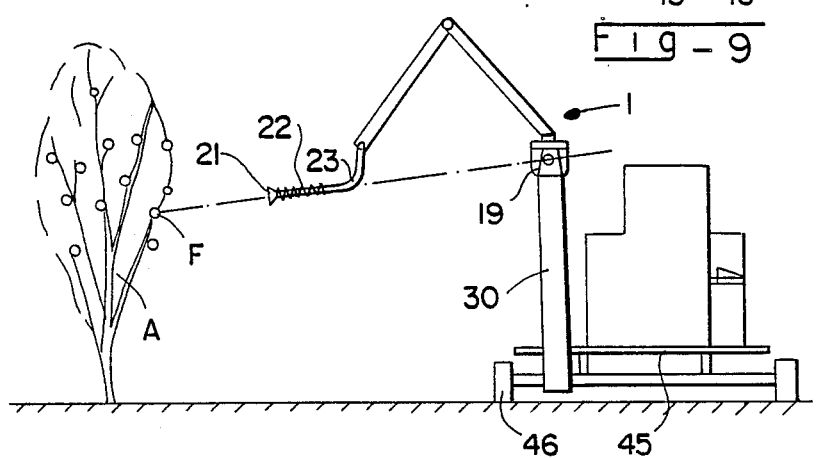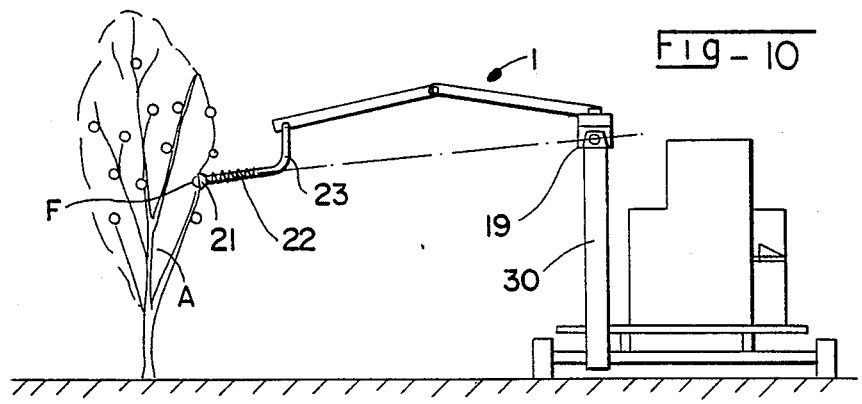

AUTOMATED MACHINE FOR DETECTION AND GRASPING OF OBJECTS

BACKGROUND OF THE INVENTION

1. Field Of The Invention

The present invention relates to an automated machine which may be used for performing various tasks involving the recognition of a predetermined object in its environment, and an intervention on that object after it is detected. This machine is, for example, preferably applied to picking fruit such as apples, pears, peaches, oranges and other citrus fruits, etc. In its application, the automated machine makes it possible to pick fruits individually by their stems and to lay them down without bruising in a container such as a large box.

2. Description Of Background Materials And Relevant Information

In agriculture, automated fruit picking has already been attempted so as to remove the contraints of manual picking or the drawbacks of mechanized picking systems, such as shaking, known up to now. Techniques used in prototypes of automated picking machines already achieved are basically of two types:

the first consists in placing a camera at the end of a movable arm fitted with a grasping system;

the second consists in placing a camera next to or near a movable arm fitted with a grasping tool, this camera being used with a sighting telescope so as to facilitate the detection of objects and responsive movements of the arm.

In the first example, the camera is quite exposed to adverse movements, such as bumps, which causes a significant obstacle in having the camera placed so close to the grasping system.

In the second example, as in the first, the grasping tool does not advance directly in the direction of the fruit by moving on the axis of the optic beam of the camera, and this causes a sighting error which prohibits the moveable arm from reaching the fruit in a good position for picking.

These shortcomings explain why the prototypes of automated machines conceived according to these techniques remain largely in the planning stage.

BRIEF DESCRIPTION oF DRAWINGS

The above mentioned goals, characteristics, and advantages of the present invention will now be more fully described with reference to the annexed drawings, given by way of non-limiting examples only, in which like reference numerals represent similar parts throughout, and wherein:

FIG. 5 is a cross-sectional view taken along plane 5—5 of FIG. 2;

FIG. 6 is a cross-sectional view taken along plane 6—6 of FIG. 3;

FIG. 7 is a lateral, enlarged view of one version of the intake head, attached to a flexible neck, as is described for attachment to a bent tube and to the free end of the folding arm of the handler; and FIGS. 8 to 10 illustrate different phases of the performance of the automated picking machine according to the preferred embodiment of the invention.

Figure 1:
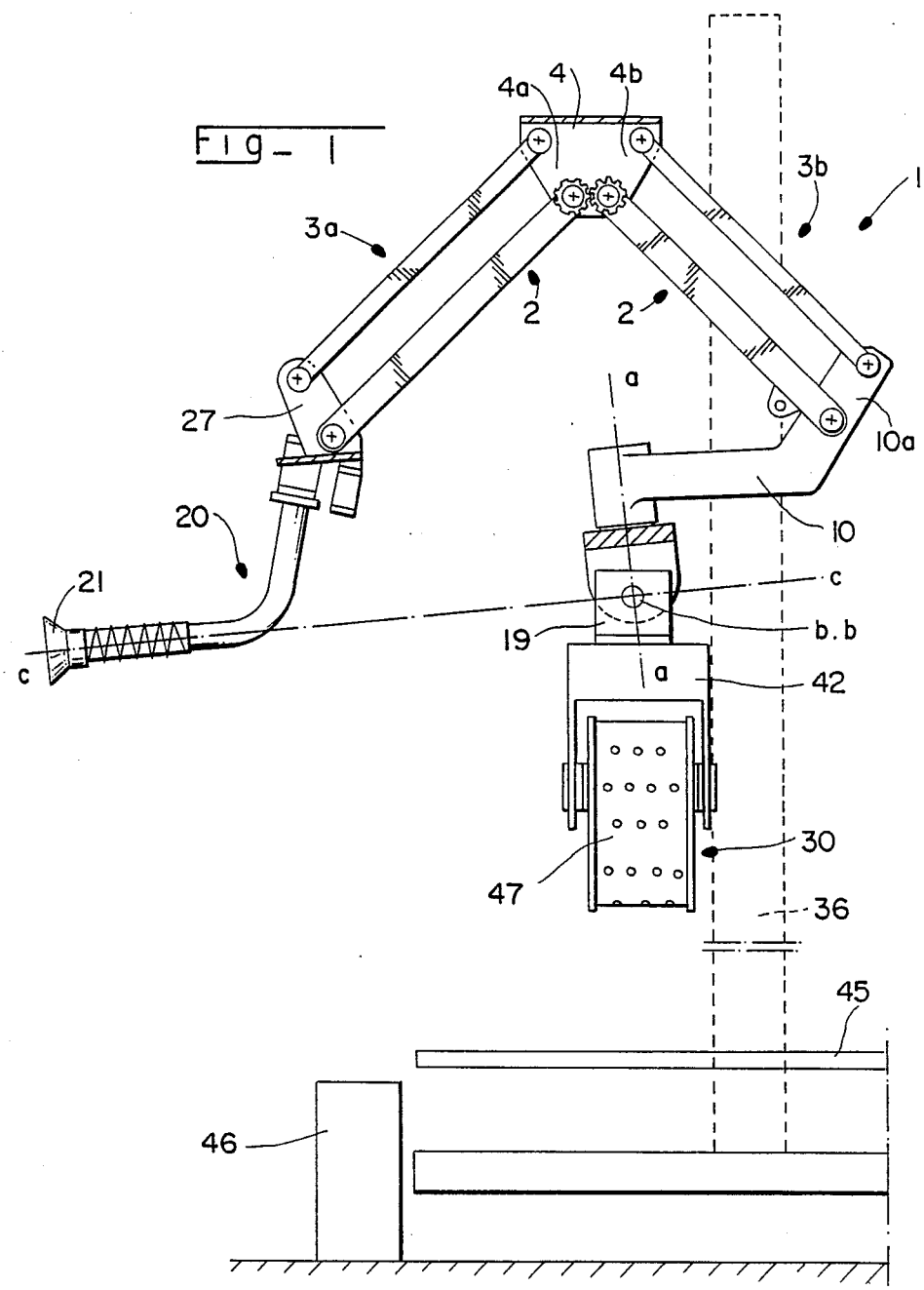
FIG. 1 illustrates, in front view, the automated machine according to the invention, and particularly arranged so as to constitute a fruit picking machine.

These drawings will be referred to in describing a preferred embodiment of the invention, although in no way are they intended to be limiting as to the uses and application of the automated machine according to the invention.

SUMMARY OF THE INVENTION

The present invention has as one particular objective to provide an automated machine for detection and grasping of objects, and in particular, for use in fruit picking to remedy the drawbacks and inadequacies as has been briefly stated above of automated systems known in the field up to this time.

The automated machine according to the invention meets this objective by the apparatus described which comprises distinct features, particularly useful in fruit picking, including that of a handler mounted with rotating aptitudes around two perpendicular and intersecting rotational axes, and having a free end that is fitted with a mechanical hand on which is attached an intake head. The automated machine also comprises a vision system that is permanently installed so that its optic beam is aligned with the point of intersection of the two rotational axes of the handler portion of the machine. The intake head of the mechanical hand is mounted with a translational latitude on the line of the optic beam of this vision system, along a rectilinear trajectory that crosses the intersection of the rotational axes at the optic center of the vision system.

The handler portion of the machine comprises a folding arm which is shown as consisting of two branches, although the invention is not limited to that number. Each branch is formed by an elongated, journalled parallelogram, with the ends of the two branches joined together at a common point by means of a connecting plate or other means for connecting. This connecting plate serves to form one short side of each of the journalled parallelegrams, and serves at the same time to provide symmetrical movement to each branch of the folding arm during its deployment or retraction. This symmetrical movement causes a rectilinear movement of the intake head portion of the mechanical hand that is attached to the free end of the folding arm. The connecting plate contains geared wheels which interlock one with another, with their movement being determined by the force exerted on adjacent ends of two internal links which are attached to the common connecting plate and form one of the long sides of each of the two journalled parallelograms of the folding arm. This force is provided by means of jacks which react to signals received based upon sensors, including that of the vision system that is mounted on the base unit of the handler, and air pressure variation signals received by means of a flexible tube that runs through the mechanical arm portion of the system, and one end of which terminates in the area of the intake head. The machine's folding arm is mounted with a rotational aptitude in a vertical plane by means of a pivoting turret which also contains an arm extension thereof that serves as the short side of the journalled parallelogram branch that is fastened by means of this pivoting turret to the base unit that supports the folding arm. The other end of the folding arm has a mechanical hand attached to it which is terminated with an intake head which receives the fruit or other object to be grasped. Deployment and retraction of the folding arm is provided by means of a jack which links the pivoting turret arm to an internal link of one of the journalled parallelograms. Rotation of the folding arm is actuated by a second jack that connects the pivoting turret to the base support unit on which the folding arm is positioned.

The pivoting turret is mounted on a base unit consisting of a stirrup which provides a vertical pivoting axis to the turret, with the stirrup itself mounted on a pivotable support which provides a horizontal pivoting axis to the stirrup and hence also to the pivoting turret which is mounted thereon. A jack provides the pivoting movement to the stirrup part of the base and hence gives corresponding movement to the folding arm.

A vision system is installed at the intersection of the two pivoting axes just described, namely the vertical pivoting axis of the turret, and the horizontal pivoting axis of the stirrup.

Further details of the vision system, in addition to those described herein, are as specified in a co-pending application filed on Nov. 5, 1987, Application Ser. No. 07/116,951, entitled "Spectral Process and Analogical Spectral Preselection in Real Time as used in an Artificial Vision System", and the information contined therein is hereby incorporated by referenced as though fully stated herein.

The mechanical hand portion of the automated machine is installed at the opposite end of the folding arm apparatus and is mounted with a rotational aptitude about the axis of its joinder with the folding arm. The mechanical hand comprises an intake head that is preferably cone-shaped and which is mounted at the end of a rigid bent tube, being connected therewith by means of a flexible neck having an ability for flexible movement about either side when a force is exerted on it, as might be encountered, for example when an obstacle is encountered as the folding arm is reaching out to grasp an object. A flexible tube or other conduit runs from the intake head through the handler unit to an air intake system and provides means for detection as to the presence of an object in the intake head, or an obstruction that has come in contact with the flexible neck. The intake head is cone-shaped outwardly so that the widest portion thereof is that which comes in contact with the object.

A hoisting arm, pivotable in the vertical plane, supports and controls the elevation of the vision system and handler and the base unit to which they are attached. The hoisting arm which is an elongated parallelegram in shape, contains a conveyor belt which receives the object grasped by the mechanical arm following its retraction and release from the intake head unit, and conveys the fruit to a gulley that channels the fruit into a container that is positioned on a movable platform towards the rear of the automated machinery.

The machine is mounted on a vehicular chassis with wheels so as to be movable down a predetermined path, such as between rows in a fruit orchard. The machine also has the ability to change its position after a predetermined number of failures, such as when no more fruit is detected or failures of the folding arm to reach a detected object, and to move on to a new location and renew its detect and group operation.

DESCRIPTION OF PREFERRED EMBODIMENT

One object of the present invention is for the realization of an automated machine for detection and picking of fruit such as apples, pears, peaches, oranges and other citrus fruits, etc. This, however, is intended in no way to limit the application of this invention to other uses. The automated machine according to the invention can be arranged so as to perform other agricultural or industrial tasks, and a variety of useful functions.

The automated machine comprises a handler 1 that contains a folding arm 2 mounted on "compass", that is, the folding arm is formed by two movable branches 3a and 3b, joined at their top in journalled fashion. The term "journalled" as used herein refers to parts joined together at one or more points which retain the capability for movement, or pivoting ability, about the point of joinder. More specifically, each branch of the folding arm forms a journalled parallelogram, elongated and joined on one end at a common meeting point by means of a connecting plate 4 which also comprises at the same time, the two short neighboring sides 4a and 4b, respectively, of the two journalled parallelograms or folding arm branches, 3a and 3b. The two branches are fastened together by means of a connecting device, known of itself, which causes a symmetrical movement of the two branches while deployment or retraction of the folding arm and rectilinear movement of the grasper mounted on the arm's free end occurs. According to the illustrated example, this connecting device is comprised of two geared wheels 6 which interlock with one another. Wheels 6 permanently and rotatably attach connecting plate 4 to the adjacent ends of internal links 5a and 5b which comprise one of the long sides of the journalled parallelograms 3a and 3b, respectively. In this way, any change in the incline of one of the journalled parallelograms leads to a symmetrical change in the incline of the second journalled parallelogram.

This arrangement makes it possible to obtain deployment or retraction of the folding arm under action of a jack 7 which is connected by means of journal 8 to a pivoting turret 10, and by means of journal 9 to internal link 5b of journalled parallelogram 3b. Turret 10 comprises an extension arm 10a which makes up the lower short side of journalled parallelogram 3b.

The use of connecting plate 4 with geared wheels 6 also makes it possible to obtain a rectilinear movement of the mechanical hand which is installed at the free end of folding arm 2 and is further described below.

It is emphasized that the geared wheel system 6 may be replaced by any other appropriate device which makes it possible to obtain the same result.

Pivoting turret 10 is mounted, with a rotating aptitude around a vertical axis a—a, on a sturdy clamp 11 which is in the shape of an inverted U. A jack 12 provides means for pivotal movement of turret 10 and, consequently, the pivoting of the entire handler around axis a—a, due to jack 12 being fastened by means of journals 13 and 14 to pivoting turret 10 and to clamp 11, respectively (FIG. 6).

Clamp 11 is mounted on a cradle 15 with a swinging latitude, around a horizontal axis b—b, which is perpendicular to vertical axis a—a. A jack 16 is fastened by means of journals 17 and 18, respectively, to lever 11a which is an extended, integral part of clamp 11, and to cradle 15, which ensures the moveability of clamp 11 and, consequently, the rotation of the entire handler around horizontal axis b—b.

Figure 3:
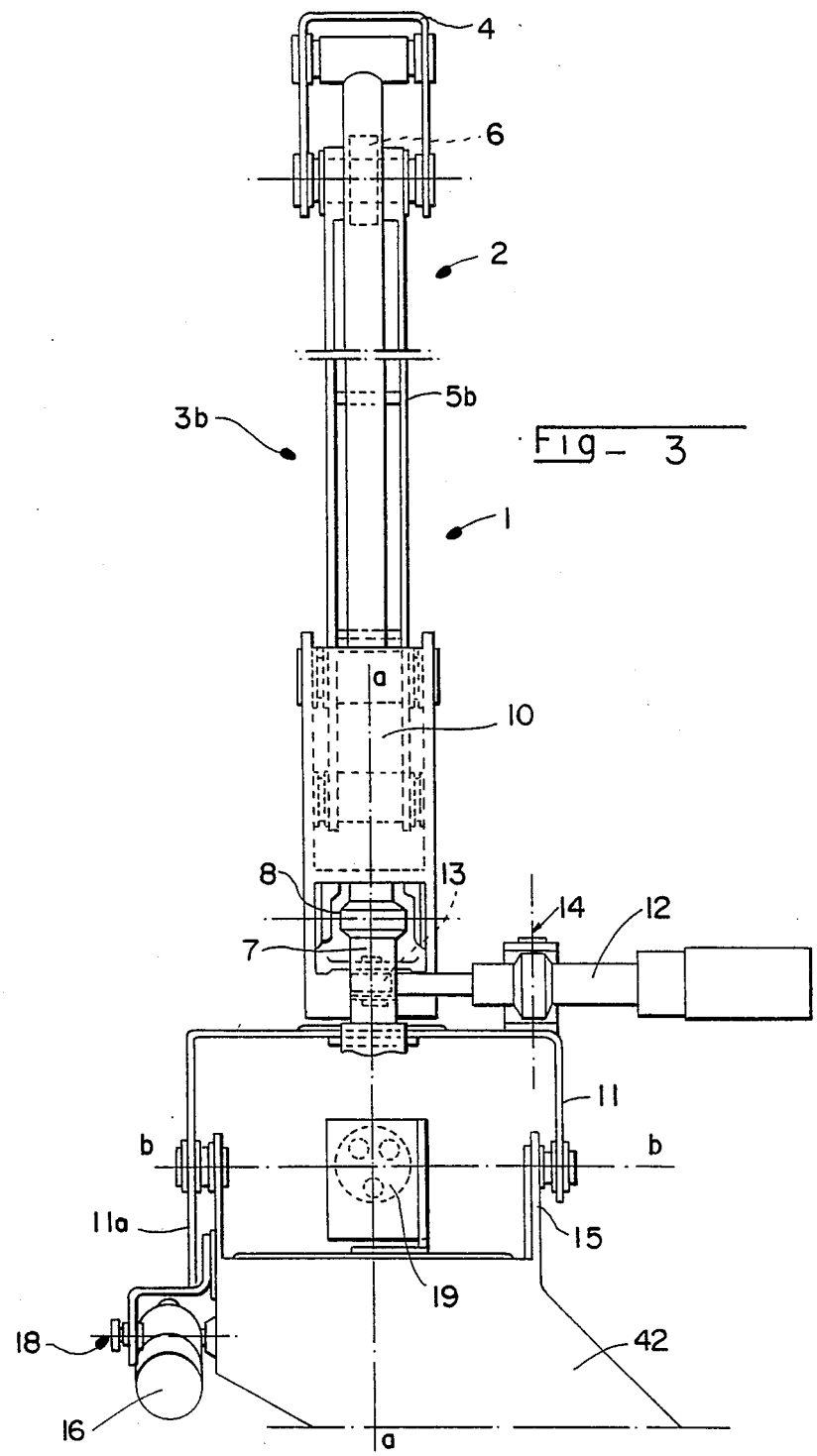
FIG. 3 illustrates, in side view, the picking module of FIG. 2.

A vision system 19, made up of a set of three convergent microcameras, is permanently installed in the bottom of cradle 15, at the intersection I of the perpendicular axes a—a and b—b (FIG. 3).

This vision system would also contain a module for processing the images recorded by the microcameras and a computer unit which controls the movements of the handler. The processing module and computer control unit are, however, not part of the present invention and therefore are not described.

Handler 1 comprises a mechanical hand 20 which is attached to the free end of its folding arm 2.

In the preferred embodiment of the invention for fruit picking, this mechanical hand 20 is comprised of a truncated intake head 21, preferably cone shaped, which is connected by means of a flexible neck 22 having capacity for elastic distortion or movement with return to its original shape, to a rigid bent tube 23. Intake head also has connected to it a flexible tube 24 which is connected to the intake mouth of a vacuum (not shown) that is installed on the chassis of the machine.

In this embodiment, the intake head 21 is obliquely truncated in its front section, with a slope on the order of 30% as shown in FIG. 7, so as to come in contact with the fruit in an effective grasping position.

The rigid bent tube 23, with intake head 21 attached thereto, is mounted with a rotational aptitude about the axis of its portion 23a which is fastened to folding arm 2 on an approximate 90 degree angle. In this way, intake head 21 can also carry out a circular movement on an arc of approximately 90 degrees, making it possible for the intake head to revert from the field of vision of the camera and to lay down the picked fruit into a designated container.

Figure 2:
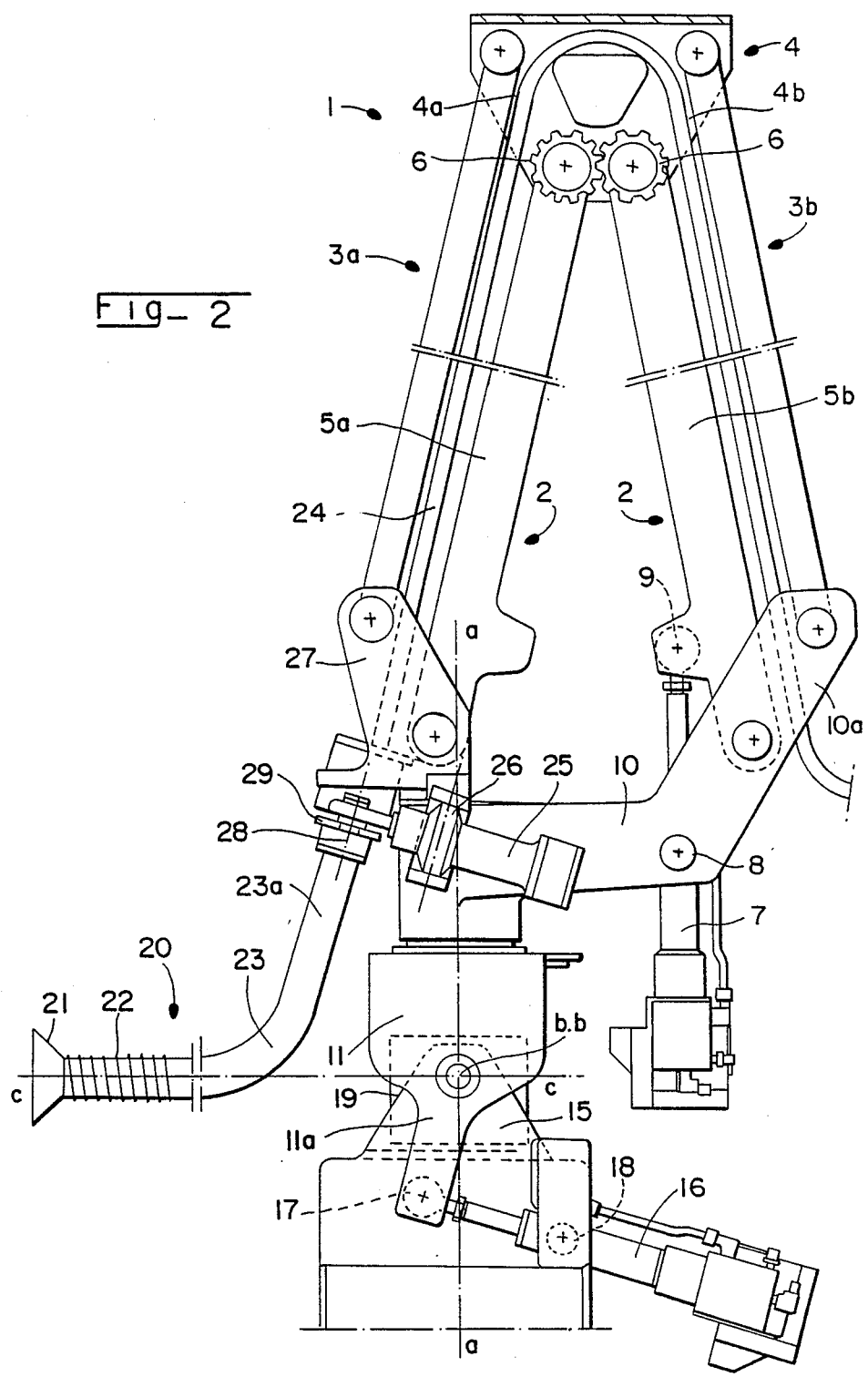
FIG. 2 illustrates, in front view and on an enlarged scale, the picking module of the automated machine.

The rotation of the mechanical hand thus described is obtained by means of jack 25 fastened, at one point, by means of journal 26 to part 27 which constitutes the short side of parallelogram 3a, and, at another point, by means of journal 28, which is attached with compensator 29 to end portion 23a of bent tube 23 (FIGS. 2 and 5).

The intake head can be equipped with additional activators, such as a grasping valve or a depression terminal, that inform the control system of the handler of the presence of fruit in the intake head 21, or even of an obstacle which twisted the flexible neck 22 and therefore blocked up the intake head. A filter can also be attached in the intake head making it possible to block and retain sucked-in leaves so as to avoid their obstruction of the vacuum or intake turbine.

According to an important characteristic of the invention, the mechanical hand, and more specifically, according to the described application, intake head 21 is mounted with a translation latitude in the line of the optic beam of vision system 19, along a rectilinear axis or trajectory c—c (FIG. 2) which crosses the intersection of the rotation axes a—a and b—b of the handler, at the optic center of vision system 19.

This arrangement makes it possible, therefore, to have the intake head of the mechanical hand perfectly coincide with the optic detection beam.

It is understood that handler 1 according to the invention is a handler with spherical coordinates, i.e., having two concurrent rotational modes and a translation mode toward the object to be grasped, and with a vision system permanently arranged in relation to the handler and placed exactly in the center of the axes of rotation and translation.

Figure 4:
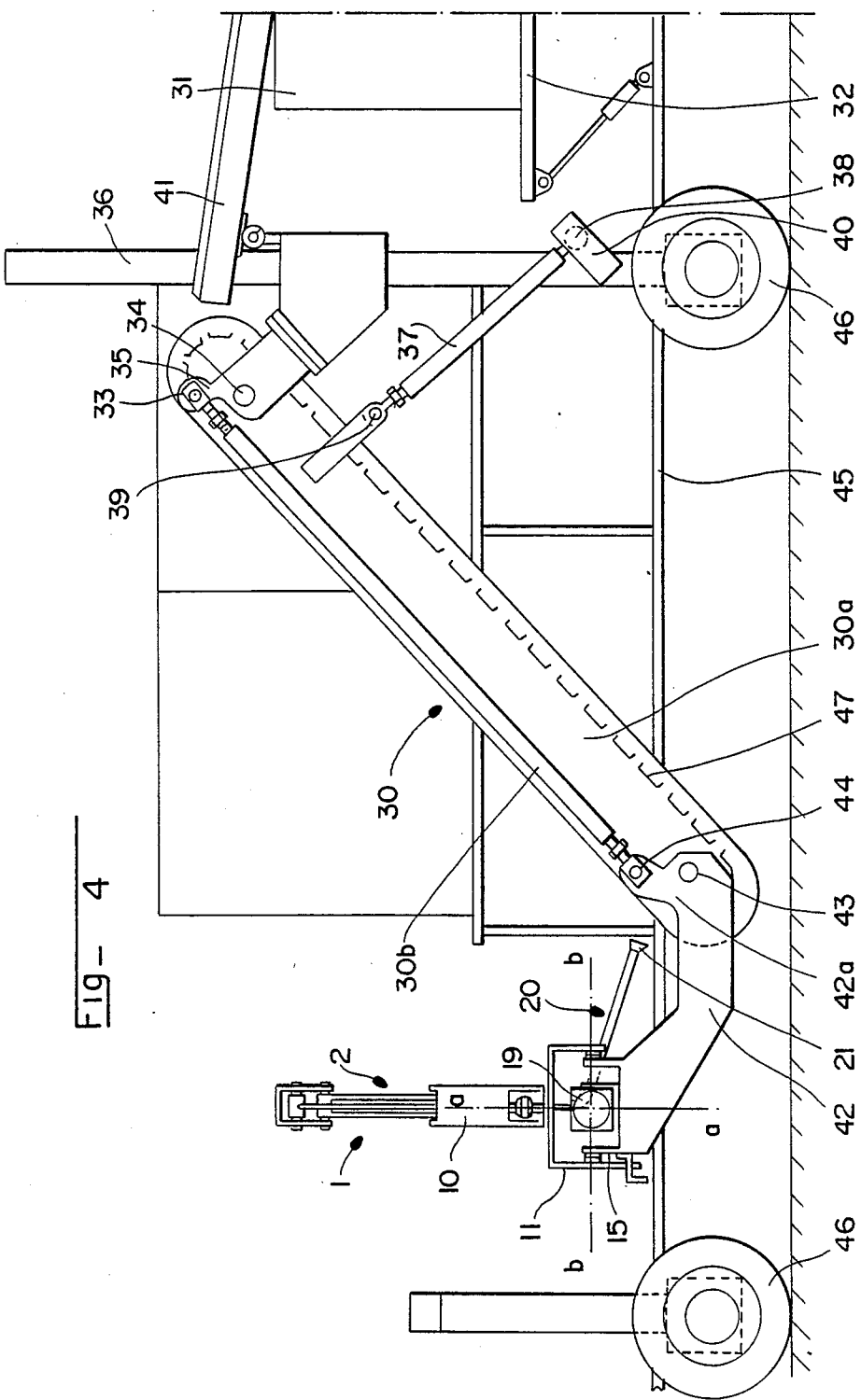
FIG. 4 illustrates, in front view, the picking machine according to the invention, including the conveyor belt and box loading apparatus.

In the preferred embodiment of the fruit picking invention, the picking module (vision system+handler) is born by a hoisting arm 30 which is used to both cause the picking module to be elevated sufficiently to reach the heights of trees and to remove picked fruit backwards toward a container 31 (large box) placed on a raised platform 32 which is equipped on the rear portion of the picking machine (FIG. 4).

Hoisting arm 30 is vertically mounted with a pivoting aptitude on the vertical plane and is comprised of an elongated journalled parallelogram whose long sides are made up of, on the one hand, a sturdy beam-chamber 30a in which is housed a conveyer which is made, for example, of an endless cloth or belt having fingers or nipples, already known in the art, and on the other hand, of two bars 30b symmetrically arranged on each side of the beam-chamber. The back ends of chamber 30a and bars 30b are, for example, fastened by means of journals 33, 34, on a support 35 which comprises the short fixed side of the parallelogram, and is supported by a vertical element 36 of the frame of the machine.

A jack 37, fastened, by means of journals 38 and 39, respectively, to the beam-chamber 30a and to a permanent element 40 of the frame of the machine, provides the pivoting movements of the hoisting arm 30 on the vertical plane.

The conveyer housed in the hoisting arm delivers the picked fruit into a gullet 41 installed in the rear part of the machine which makes it then possible to channel the fruit into container 31.

The short movable side of the journalled parallelogram 30a-30b-35 is comprised of one of the end portions of an elongated support 42 on which are fastened, by means of journals 43 and 44, the beam-chamber 30a and the bars 30b, respectively. The opposite end portion of elongated support 42 is arranged so as to comprise cradle 15 in which the vision system is installed.

The different jacks of the machine can be hydraulic, pneumatic, or electric jacks controlled by hydraulic pneumatic, or electric activators known in themselves.

Handler 1, vision system 19, hoisting arm 30, and different devices essential to the performance of the machine, are installed on the chassis 45 of an automotive vehicle equipped with wheels 46 and fitted with a self-guiding system allowing it to move between the rows of trees without a driver on board. This self-guiding system is not part of the present invention.

The performance of the automated picking machine which has just been described is completely automatic, although resuming manual control may be possible at any time.

With reference to FIGS. 8-10, the vehicle moves forward in the row and stops in front of a tree A. The mechanical hand, comprising intake head 21, flexible neck 22, and bent tube 23, is retracted laterally so as to free the field of vision of camera 19. The set comprised of vision system 19 and handler 1, both supported by hoisting arm 30, is elevated to an appropriate height along the fruit hedge while the vision system, previously adjusted according to visible features of the fruit to be picked, searches for the fruit (FIG. 8).

As soon as a fruit F is detected by the appropriate image appearing at the center of the coordinates of vision system 19, the hoisting arm stops. Mechanical hand 21-23 pivots and moves in the deployment plane of folding arm 2, which moves in horizontal and vertical rotation on the two coordinates of detection, then the mechanical hand is deployed with symmetrical movement of the folding arm by means of the journalled connection, in compass arrangement, of its two branches (FIG. 9).

The conically-shaped picking intake head 21, attached to flexible neck 22 of the mechanical hand, moves toward the fruit in rectilinear translation on the axis of the optic beam of the camera. When it comes in contact with the fruit (FIG. 10), a depression is caused by the fruit's obstruction of the entry of the intake head, which is detected by a manostat or other device maintaining a constant pressure within an enclosure, which is located under the handler and is connected to the intake head by means of tube 24.

The obstruction so detected causes the arm to then fold back and the recoil of the intake head which results in a detachment or picking of the fruit from the tree. The folding arm is then retracted by pivoting approximately 90 degrees and once the mechanical hand is positioned over the hoist, the fruit is released from the intake head by the action of a depressurizing clamp (not shown), and is delivered onto the cloth with fingers of conveyer 47 housed in the hoisting arm, which then routes the fruit into gullet 41 which channels the harvest towards and into container 31 positioned in the rear atop platform 32.

The retraction of folding arm 2 also makes it possible to free up the field of vision of the camera to take a new picture and to carry out a new picking sequence, the picking cycle continuing as long as there remains fruit detected on the scene covered by vision system 19, or as long as the number of picking failures does not exceed a predetermined threshold.

If an obstacle is present on the trajectory of the intake head, the flexible portion of the mechanical hand, comprised of neck 22, twists and thereby closes the intake conduit of flexible tube 24 (as if a fruit had obstructed the entry opening of the intake head), which immediately causes the handler arm to fold back. This makes it possible to avoid the troublesome consequences of running into possible obstacles.

If the detected fruit is too far away, the lever immediately folds back after full deployment, then moves toward a new target.

After a predetermined number of failures in grasping a detected object on the same scene (for example after five failures), or when there is no more fruit detected on the picture, the vision and handling set moves towards the top of the fruit hedge and the vision system examines new scenes.

When the vision and handling set reaches the top of the fruit hedge, it moves back downwardly into a lower position. The vehicle then moves forward a distance corresponding to the width of the fruit hedge swept during the preceding passage, and a new detection and picking cycle begins anew.

When the vehicle comes to the end of a row, it turns, so as to begin a new picking cycle in the neighboring row.

Although the description presented has been of an automated machine comprising a single picking set, it is nevertheless obvious that such a machine could comprise two picking sets arranged on each side of its axis of progression, thus making it possible to pick fruit located on both sides of the machine. In the same way, a machine of this kind could be equipped with more than two picking sets so as to increase its yield.

Further, the vision search or "sweeping" of a given area, such as of a fruit hedge, could be operated by performing a descending movement, instead of the machine performing an ascending movement as has been described.

Finally, although the invention has, as noted above, been described with reference to particular means, materials and embodiments, it should be noted that the invention is not limited to the particulars disclosed, and extends to all equivalents within the scope of the claims.

We claim:

1. An automated machine for grasping objects, said machine comprising:
   (a) a handler having a first end and a second end;
   (b) an intake head attached to one of said ends of said handler for grasping an object;
   (c) a base unit comprising means for supporting said handler for rotation of said handler about two axes of rotation which crosses at a point of intersection;
   (d) means for moving said handler about each of said two axes of rotation;
   (e) means for moving said one of said ends of said handler along a rectilinear path towards said object, wherein said rectilinear path intersects said point of intersection of said two axes of rotation;
   (f) a vision system fixedly positioned with respect to said handler in said base unit, including means for controlling said means for moving said handler along a rectilinear path towards said object, wherein said vision system comprises an optic center which is located at said point of intersection of said two axes of rotation of said handler; and
   (g) a sensor for detecting contact between said object and said intake head.

2. An automated machine in accordance with claim 1, wherein said handler comprises a folding arm comprising two branches, each of said branches formed by a journalled parallelogram elongated in shape, said branches being mounted together at one end by means of a connecting plate, said connecting plate also forming one short side of each said journalled parallelogram, and serving to provide symmetrical movement to said two branches during deployment or retraction of said folding arm, wherein said symmetrical movement causes a rectilinear movement of said intake head of said machine.

3. An automated machine in accordance with claim 2, wherein said connecting plate permits a symmetrical movement of said two branches of said folding arm, and comprises two geared wheels which interlock with one another, wherein movement of said geared wheels is variable based upon force exerted on adjacent ends of two internal links attached to said connecting plate, each of said internal links forming one long side of each said journalled parallelogram of said folding arm.

4. An automated machine in accordance with claim 3, wherein said folding arm is rotatably mounted on a pivoting turret comprising a pivoting turret arm forming a short side of a first journalled parallelogram that is fastened by means of said turret to a support of said folding arm; wherein said mechanical hand is installed at the lower end of a second journalled parallelogram of said folding arm whose deployment and retraction are provided by means of a deployment jack which links said pivoting turret arm to an internal link of first said journalled parallelogram; and wherein rotation of said folding arm is actuated by means of a rotational jack connecting said pivoting turret to said support.

5. An automated machine in accordance with claim 4, wherein said folding arm is attached to said pivoting turret which is mounted on a stirrup, said stirrup being pivotally mounted on a support about an axis which is perpendicular to a pivoting axis of said stirrup; wherein pivoting of said stirrup and corresponding movement of said folding arm are obtained by means of a jack connecting said stirrup to a base on which said stirrup rests.

6. An automated machine in accordance with claim 5, wherein said vision system is installed at intersection of the pivoting axis of said turret and of the pivoting axis of said stirrup.

7. An automated machine in accordance with claim 6, wherein said mechanical hand is rotatably mounted to the free end of said handler.

8. An automated machine in accordance with claim 7, wherein said intake head is mounted at the end of a rigid tube that is offcenter from said handler, and is also connected by means of a flexible conduit to an air intake system.

9. An automated machine in accordance with claim 8, wherein said intake head is attached to an elastic neck with a distortion elasticity that allows movement of said neck.

10. An automated machine in accordance with claim 9, wherein said intake head is obliquely truncated outwardly so that the widest portion of said intake head is that which comes in contact with the object to be grasped.

11. An automated machine in accordance with claim 9, wherein said intake head is obliquely truncated outwardly so that a lower portion of said intake head is that which first comes into contact with the object to be grasped.

12. An automated machine in accordance with claim 1, wherein said handler comprises:
(i) a folding arm having a free end comprising at least two branches, each of said branches comprising two elongated and parallel members pivotably joined at either end by rigid short members so as to form a journalled parallelogram;
(ii) a means for connecting at least two of said branches of said folding arm, said means for connecting including an element serving as one of said rigid short members of said journalled parallelogram; and
(iii) a mechanical arm extending from one end of one of said branches for making contact with an object to be grasped.

13. An automated machine in accordance with claim 12, wherein said mechanical arm is rotatably mounted to one end of one of said branches of said folding arm.

14. An automated machine in accordance with claim 12, wherein said mechanical arm is installed at said free end of said folding arm by means of a curved, rigid, tube rotatably joined at one end to said folding arm, having an elastic neck affixed to an opposite end of said curved, rigid tube to which said intake head is attached.

15. An automated machine in accordance with claim 14, wherein said elastic neck is capable of being distorted when force is obliquely applied so as to return to its original shape and position when said force is removed.

16. An automated machine in accordance with claim 12, wherein said mechanical arm comprises a flexible tube input sensor including means to detect when any part of said mechanical arm has been twisted out of shape by a predetermined amount by an outside force applied to it.

17. An automated machine in accordance with claim 16, wherein said flexible tube comprises a first end and a second end, said first end connected to said intake head, and said second end connected to an air pressure detection and control unit.

18. An automated machine in accordance with claim 17, wherein said flexible tube input sensor is mounted beyond said mechanical arm, handler, and base unit of said automated machine and is connected to said intake head by means of a flexible tube.

19. An automated machine in accordance with claim 18, wherein said flexible tube is adapted to contain variable air pressure used to grasp and release objects placed in contact with said intake head.

20. An automated machine in accordance with claim 18, wherein said end one of said support comprises a cradle in which said vision system is installed.

21. An automated machine in accordance with claim 12, wherein said mechanical arm comprises a flexible tube input sensor having means for detecting the presence of an object in said intake head.

22. An automated machine in accordance with claim 12, wherein said machine is adapted to automatically advance said folding arm a predetermined distance upwardly after a predetermined number of failures occurs in grasping of a detected object.

23. An automated machine in accordance with claim 12, wherein said machine is adapted to automatically advance said folding arm a predetermined distance downwardly after a predetermined number of failures occurs in grasping of a detected object.

24. An automated machine in accordance with claim 12, wherein said machine automatically advances said folding arm a predetermined distance downwardly, when an object is no longer detected by said vision system.

25. An automated machine in accordance with claim 1, wherein said intake head is comprised of an obliquely truncated cone so that the widest part of said cone extends outwardly from said automated machine.

26. An automated machine in accordance with claim 1, wherein said handler and said vision system are supported by a hoisting arm, said hoisting arm having a first end and a second end, said first end being connected to said base unit of said automated machine on which said handler and said vision system are mounted, with said second end being connected to a support with a pivoting aptitude in the vertical plane.

27. An automated machine in accordance with claim 1, wherein said machine is installed on the chassis of an automotive vehicle equipped with wheels and comprising a self-guiding system for movement along a path.

28. An automated machine in accordance with claim 27, wherein said automotive vehicle can be manually operated.

29. An automated machine in accordance with claim 27, wherein said vehicle and said machine mounted thereon comprise means for turning and continuing the operation of said machine in a new direction when said automotive vehicle comes to the end of a row.

30. An automated machine in accordance with claim 27, wherein said automotive machine can be automatically operated.

31. An automated machine in accordance with claim 12, wherein said means for connecting is adapted to provide for symmetrical movement of each of said branches of said folding arm when either branch is acted on by an outside force.

32. An automated machine in accordance with claim 31, wherein said means for connecting comprises two geared wheels that interlock one with another.

33. An automated machine for grasping objects, wherein said machine comprises:
  (a) a handler comprising:
    (i) a folding arm having a free end comprising at least two branches, each of said branches comprising two elongated and parallel members pivotably joined at either end by rigid short members so as to form a journalled parallelogram;
    (ii) means for connecting at least two of said branches of said folding arm, said means for connecting including an element serving as one of said rigid short members of said journalled parallelogram; and
    (iii) a mechanical arm extending from one end of one of said branches for making contact with an object to be grasped;
  (b) a flexible tube input sensor including means for detecting when any part of said mechanical arm is twisted out of shape by a predetermined amount by an outside force applied to it;
  (c) an intake head attached to one end of said handler;
  (d) a base unit for supporting said handler providing at least two axes of rotation, wherein said means for supporting said handler for rotation of said handler about two aces of rotation comprises:
    (i) a turret pivotably mounted about a turret vertical axis and having an arm extending outwardly therefrom to which is attached one end of one of said branches of said folding arm;
    (ii) a stirrup pivotably mounted about a stirrup horizontal axis on a support, said stirrup horizontal axis being perpendicular to said turret vertical axis; and
    (iii) a jack connected to said stirrup and to said support for moving said stirrup and said folding arm;
  (e) means for providing translational movement to said handler; and
  (f) a vision system installed in said base unit of said machine.

34. An automated machine in accordance with claim 33, wherein said vision system is permanently installed in said base unit of said machine with an optic line of said vision system positioned at the intersection of said turret vertical axis and said stirrup horizontal axis.

* * * * *